United States Patent [19]
Boyce

[11] Patent Number: 6,012,091
[45] Date of Patent: Jan. 4, 2000

[54] VIDEO TELECOMMUNICATIONS SERVER AND METHOD OF PROVIDING VIDEO FAST FORWARD AND REVERSE

[75] Inventor: Jill MacDonald Boyce, Manalapan, N.J.

[73] Assignee: AT&T Corporation, New York, N.Y.

[21] Appl. No.: 08/885,911

[22] Filed: Jun. 30, 1997

[51] Int. Cl.⁷ .................................................. H04N 7/173
[52] U.S. Cl. ................................ 709/219; 348/7; 348/17; 455/4.2
[58] Field of Search ..................................... 348/7, 12, 13, 348/14, 15, 16, 17, 18, 19, 10; 455/4.2, 5.1, 6.2, 6.3; 386/68; 709/219

[56] References Cited

U.S. PATENT DOCUMENTS

| | | | |
|---|---|---|---|
| 5,377,051 | 12/1994 | Lane et al. | 360/33.1 |
| 5,479,303 | 12/1995 | Suzuki et al. | 360/72.2 |
| 5,576,902 | 11/1996 | Lane et al. | 386/68 |
| 5,583,650 | 12/1996 | Lane et al. | 386/81 |
| 5,592,299 | 1/1997 | Boyce et al. | 386/68 |
| 5,692,092 | 11/1997 | Nogami et al. | 386/68 |
| 5,732,217 | 3/1998 | Emura | 395/200.49 |
| 5,818,512 | 10/1998 | Fuller | 348/8 |

*Primary Examiner*—Chris Grant
*Attorney, Agent, or Firm*—Banner & Witcoff, Ltd.

[57] ABSTRACT

A video telecommunication server for use in providing a fast scan of a video telecommunication comprises a bitstream store for receiving and storing a coded input video telecommunication digital bitstream. The server further comprises a video decoder for decoding the received digital video bitstream and, in one embodiment, a representation of every nth frame of said decoded digital video signal is stored in a frame store depending on a desired speed-up rate, where n is greater than one. A video encoder reencodes the stored video telecommunication predictively such that every nth frame is predicted based on the preceding frame. A fast scan digital video bitstream is generated for output by the video encoder that represents the fast scan video telecommunication, either in a fast forward or fast reverse direction. A receiver for receiving a control input may receive data representing the direction of fast scan and the speed-up rate. In further embodiments, the video encoder comprises an intra frame encoder or provides for requesting intra frames from a transmitting video encoder at periodic intervals.

31 Claims, 3 Drawing Sheets

VIDEO TELECOMMUNICATIONS SERVER AND METHOD OF PROVIDING VIDEO FAST FORWARD AND REVERSE

BACKGROUND OF THE INVENTION

1. Technical Field

The present invention relates to the field of video telephony and, more particularly, to a video telecommunications server for providing fast forward and fast reverse, for example, for video message review or Internet video screening.

2. Description of the Related Arts

The American Telephone and Telegraph Company, now commonly known as AT&T, introduced a PicturePhone (R) video telephone in the 1960's. An approximately one megahertz bandwidth analog television signal was generated by a small camera of special video telephone apparatus for transmission over standard telephone wire facilities to a special wideband switch which communicated with other such switches. It was expected that both caller and calling party would be equipped with such special video telephone apparatus. Calls were to be placed in a conventional manner from one PicturePhone video telephone apparatus to another where the received television signal was displayed on a relatively small screen (compared to that of a television set).

With the advent of the so-called World Wide Web and the advancement of digital telephony, AT&T and other industry participants have joined in promoting standards for video telephony including International Telecommunications Union (ITU) standards H.320 and H.324. Within the H.320 standard is a video portion for ISDN (relatively high speed) digital data rates, namely standard H.261, while another standard, H.263, has been promulgated for slower speed, plain old telephone service (POTS) data rates. One viewing the POTS video telephony call will see a relatively choppy, slow frame rate, picture sequence evolve. Both the H.261 and H.263 standards (hereinafter referred to as the H.26x standards) provide for some digital video signal compression. In this manner, a relatively high resolution signal can be provided over a relatively narrow bandwidth telecommunications channel. Typical digital data rates for POTS are 28.8 kilobits per second; while ISDN rates exceed one megabit per second.

Other video compression standards are known, for example, the well known Moving Pictures Experts Group (MPEG) video compression standards. A key difference between the H.26x standards of the ITU and those of MPEG is that in an MPEG system for broadcast, intra frames are generally sent regularly and reasonably often so that synchronization and recovery of individual frame data is relatively easy in MPEG. In an H.26x compressed signal, intra frames are generally sent infrequently, for example, because of the one-to-one, two way communication between video phone callers. A receiver requests that the transmitter send an intra frame, whenever there is a loss of synch, for example, due to a loss of transmission.

In MPEG compression and decompression, one can assume that intra frames providing information for decompressing a following sequence of compressed data frames will be present at regular intervals in the received data bitstream and so information can be extracted from those frames to form a fast forward bitstream, for example, for a digital video tape recorder. An article entitled "Fast Scan Technology for Digital Video Tape Recorders" of Boyce et al. published in *IEEE Transactions on Consumer Electronics*, August, 1993, at pages 186–191, describes the implementation of fast forward and fast reverse in an MPEG environment and, in particular, in connection with the design of an Hitachi high definition digital video tape recorder (DVTR). Patents describing related DVTR technology include U.S. Pat. Nos. 5,377,051; 5,576,902; 5,583,650; and 5,592,299.

Audio messaging is well known and provided presently as a network service offering, as a stand-alone product for home or office or associated with a private branch exchange. So-called voicemail involves typically an announcement that the called party is presently unavailable, an announcement that one may leave a message after a signal and the recording of the message. Fast scanning of a message in either a forward or backward direction serves little useful purpose as a user could not understand the message—it would be unintelligible. On the other hand, from the use of video cassette recorders, users are well acquainted with the advantages of fast forward and reverse of video sequences. The user is able to move to a scene of particular interest and then, using appropriate input commands, typically by remote control keypad, slow the video and audio to normal speed to obtain both intelligible audio and video.

As video telephony applications advance, it is perceived that there will exist a need for video messaging or other video telecommunications review opportunities where a user may wish to fast scan through a video telecommunication in either a forward or reverse direction without intelligible audio, for example, to locate a point in the video telecommunication at which the user wishes to proceed with playing the video telecommunication at a normal rate with intelligible audio. In other words, there exists a need in the art for a video telecommunications server that may be associated, for example, with a telecommunications switch or Internet server for permitting fast scanning of video telecommunications upon user request.

SUMMARY OF THE INVENTION

According to the principles of the present invention, a video telecommunications server comprises both a video decoder for decoding coded, compressed video and a video encoder for reencoding a fast scan video telecommunication for transmission to a user upon user request. The user, for example, may be playing a video telecommunication at normal speed and may wish to return to a previous location at fast reverse in order to replay at normal speed to review some missed action in the video telecommunication. In particular, a video telecommunications server comprises a processor controller for receiving commands of a user in regard to a video telecommunication, memory for storing a video telecommunication bitstream, a high speed video decoder for decoding the received telecommunication at n times real time, where n may be a positive integer greater than one, a frame storage for storing a plurality of decoded frames and a video encoder for generating a new fast scan digital bitstream to the user, either in a forward or reverse play direction, all under control of the controller. In this simplest embodiment, the server receives the bitstream of the video telecommunications and stores it temporarily and then uncompresses and decodes every frame of the telecommunication at high speeds (depending on the desired speed-up rate) in order to store a representation of every nth frame of the decoded digital video signal. The server stores a sequence of properly decoded frames comprising, for example, every nth decoded frame where n represents the speed-up rate, for example, where n equals 4 or 8, and finally reencodes the sequence comprising every nth frame as a fast scan video signal for transmission to the user's video decoder and display. A fast forward bitstream is encoded using only every nth frame to predict, for example, where n equals 8, frame 8 from frame 0, frame 16 from frame 8 and so on. The fast reverse is similarly predicted where frame 120 is predicted from frame 128, 112 from frame 120, and so on. The user will receive the same resolution signal as if the video telecommunication were provided at normal speed and at the same frame rate but such that only every nth frame of the original video telecommunication sequence is displayed on their personal computer, video telephone or other display device.

In a second embodiment of the present invention, the problem of alleviating memory requirements is examined. In this embodiment, the server comprises a standard video decoder (not necessarily a high speed decoder), a standard frame store, and additionally comprises an intra video encoder and store for storing an intracoded digital video bitstream. In this embodiment, the fast scan frames are stored compressed in intra format as an intracoding of that frame. Consequently, a three to as high as ten or more times memory storage savings may result, depending on the intra-coding compression ratio.

In yet a third embodiment, memory requirements may be alleviated even further. In this embodiment as with the second embodiment, a normal speed video decoder is provided for decoding the input video bitstream. However, in this embodiment a video encoder having an extra intracoded frame capability is used for feeding the fast scan bitstream store. A standard video decoder is used to decode and decompress the fast scan bitstream and a standard video encoder is used to provide the fast scan sequence to the user for decoding and display. Thus, in the third embodiment, the result is a predictive coding of the sequence formed of every nth frame of the original message. An advantage of ITU telecommunications is that the server, upon receipt of a fast scan command, may periodically request an intracoded frame to restore synchronization and obtain decompression instructions on the following sequence of frames. Consequently, in accordance with the present invention, the method of providing a fast scan video telecommunication in this third embodiment may comprise the additional step of periodically requesting and receiving an intracoded frame, for example, every 132 frames. Since in an MPEG environment an intracoded frame is, by convention, periodically provided in a compressed digital video bitstream, the additional step of periodically requesting and receiving an intracoded frame is not required.

Further advantages and features of a video telecommunications server and method of providing a fast scan video telecommunication will be understood from studying the accompanying drawings and from the detailed discussion of the drawings which follows.

DETAILED DESCRIPTION OF THE DRAWINGS

Figure 1:
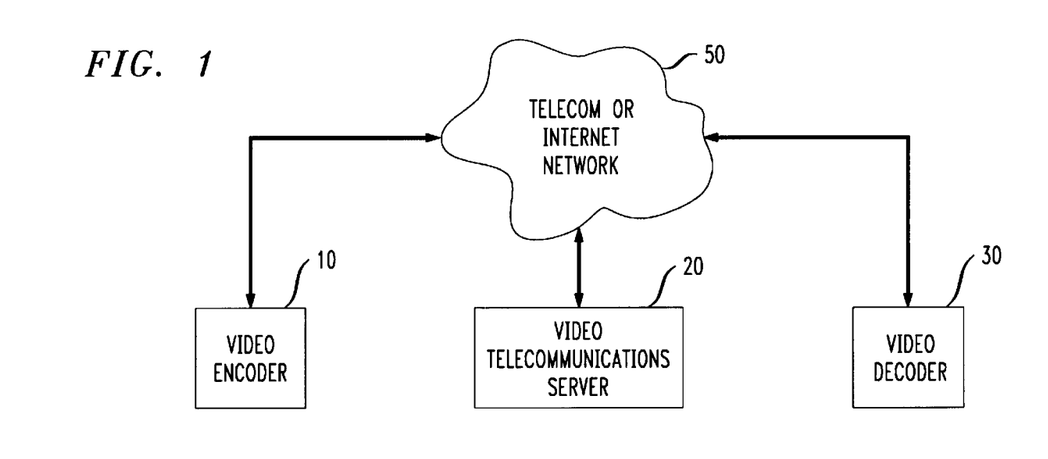
FIG. 1 is an overview drawing of a telecommunications or Internet network including a video telecommunication server according to the present invention.

Referring to FIG. 1, the general application of a video telecommunication server will be described in the context of its implementation in an Internet or switched telecommunication network. There is shown a system in which a calling party equipped with a video encoder 10, for example, a personal computer equipped with a modem, keyboard, video camera and microphone, or other video telephone equipment, places an ITU H.324 video telephone call to a called party. The call may be via a switched telecommunications or Internet network represented by cloud 50. The call is processed in a conventional manner. In an Internet or a telecommunications environment, an address of a called party is provided to the network 50 and the network 50 determines the status of the addressed called party equipped with a video decoder 30. The video decoder 30 typically also comprises a personal computer equipped with a modem, keyboard, video display and audio speaker or other video telephone equipment.

The present invention relates to a situation in which the video telecommunication does not proceed for one reason or another, for example, the calling party receives a ring, no answer indication or the called party is either busy or has previously signaled the network to answer with a busy indication. According to the present invention, the calling or called party may subscribe to a service in which a video telecommunication server 20 is signaled to serve the caller. In the case of a calling party service, the server 20 will record a video telecommunication and continue to try to ring the called party until the message can be delivered. In the case of a called party initiated service, a video telecommunication may be recorded and delivered once the called party is ready to receive the communication. The present invention may also be useful for receipt of pay-per-view or other video presentations, movies, pre-recorded tours and the like, transmitted, for example, by a digital video server via telecommunications lines or via the Internet.

The server 20 communicates with the caller in the case of a video messaging service as if the server were a standard video telephone. Consequently, the caller does not need to be aware that they are communicating with a video telecommunication server rather than another standard video telephone. The server 20 may be located on the called party's premises, associated with a private branch exchange, with a serving local office to the caller or called party or be a shared resource of a toll network such as one provided by AT&T or other toll carrier.

Server 20 may be assumed to have been previously initialized to conform with the user's video encoder 10 and video decoder 30. For example, the users of a video telecommunication server 20 according to the present invention will be requested to provide call set-up and video telephone parameter information, such as one quarter of common interchange format (QCIF) size pictures, whether or not bidirectionally predicted frames are supported, and the like. (Common Interchange Format comprises a resolution of 352×288 pixels where a pixel is represented by one byte of data, and Quarter Common Interchange Format represents a resolution of 176×144 pixels.) Other resolutions may be supported by following the principles of the present invention, and QCIF is only indicated by way of example.

Once the server 20 is linked to the caller's video encoder, and as will be explained further herein, the server 20 stores the incoming video, audio and any other associated bitstreams (for example, closed captioning or other accompanying digital bitstream). The user of the video decoder 30 then signals their state of preparedness to receive an incoming call and the video telecommunication is provided for decoding and display at normal or fast speeds, normal with normal decompressed audio and fast scan, typically without audio. In accordance with the present invention, only every nth frame of a reencoded video sequence is provided in a fast forward or fast reverse mode of operation. Thus, a user may quickly scan a message or a video presentation without intelligible audio such as a movie to determine a point of possible interest and then signal the server 20 to provide a normal speed play at the point. Also, when a user is listening to a normal speed message, they may wish to fast reverse to a position of interest and replay at normal speeds if, for example, they did not hear or see the video telecommunication the first time.

The present invention does not deal with a normal H.324 video or other standard video telecommunication but rather assumes such is well known in the art. The present invention concerns itself with the problem of implementing a video telecommunication server having a fast scan feature, the fast scan being complicated by the fact that in either an ITU or MPEG environment, a video telecommunication will be compressed and consequently not capable of being immediately displayed without intra frame information which provides synchronization, for example, when and where to begin decompression, and decompression information for decompressing a following sequence of frames which, for example describes how the sequence of frames was encoded and compressed.

Audio compression and decompression are also not considered in the present invention and are presumed to be accomplished in a conventional manner in accordance with the well known standards. Moreover, network (Internet or switched telecommunication) signaling and performance are assumed to be conventional. For example, with the advent of cable modems employing optical fiber to feeder distribution systems, the speed or bandwidth of telecommunications to the called party may exceed ISDN rates and the principles of the present invention may be extended from a POTS or ISDN environment to future high speed, high bandwidth communication.

Now referring to FIG. 2, a first embodiment of a video telecommunication server 20 according to the present invention will be described, FIG. 2 comprising a detailed schematic block diagram of such a first embodiment. According to FIG. 2, a video telecommunication server 20 comprises a control signal input 110 for receiving user commands. The control signal input may receive voice commands or keyboard or mouse generated commands. Typically, in a conventional sense, the telecommunication control may be via dual tone multi-frequency (DTMF) detection, speech recognition, or signaling data stream reception and interpretation (for example, keyboard or mouse generated). The received command signals may represent commands for playing a video telecommunication at normal or fast scan speeds and responses to prompts for such commands provided by a prompting announcement generator known in the art (not shown). Controller/processor 100 receives user commands and operates accordingly. Peripheral devices or incorporated devices shown in block diagram form to the controller/processor 100 all operate under its command although not all arrows from controller 100 are shown connecting to all of components 120, 130, 140 and 150. These components include a bitstream store 120 for storing an incoming digital video telecommunication bitstream; a high speed, real time video decoder 130 for decoding and decompressing the received video telecommunication; a multiple frame storage 140 for storing a representation of every nth frame of a decompressed frame sequence, where "n" is greater than one and represents the speed-up rate, generated from the received digital bitstream; and a video encoder 150 for reencoding a fast scan video signal from the stored representation for transmission toward the user, typically the called party or one requesting the service. It is presumed that the user has now initiated a command, received at input 110, to receive a fast scan (forward or reverse) of a video telecommunication.

Now the operation of the embodiment of FIG. 2 will be described in detail. In an H.263 video telephone call, used by way of example, typically the first frame of the call is encoded in intra format. All other frames of a video telecommunication typically are coded predictively from earlier frames, although each macroblock is required by the known standards to be updated by being intracoded within each 132 coded frames. To display video in fast forward, only a subset of the frames of a received video telecommunication need to be displayed. In an MPEG video telecommunication, since typically there are periodically provided intra frames in a transmitted bitstream, one could extract only those frames for display as, for example, would be accomplished in an MPEG-based high definition digital video tape recorder.

In video telephony according to the H.263 standard, one cannot assume that an intraframe will be periodically provided. Intra frames occur infrequently and not at regular intervals in the received bitstream. One cannot simply extract information representing a subset of inter-coded frames because the intermediate frames are needed for correct decoding of a given frame. For example, consider a video bitstream where frame 0 is coded intra and all other frames are interceded (they are dependent on each other for correct decoding). Frame 1 is coded predictively from frame 0, frame 2 from frame 1, frame 3 from frame 2 and so on while it is not possible to correctly recover a subsequent frame, for example, frame 3 from frame 0. For a desired speed-up rate of say "n", where n is, for example, 8 (the video sequence is viewed at eight times its normal rate), one cannot simply extract information from the bitstream from frame 0, frame 8, frame 16, and so on and generate a new bitstream for these. To properly decode frame 8, frame 7 is needed and to decode 7, frame 6 is needed and so on.

Figure 2:
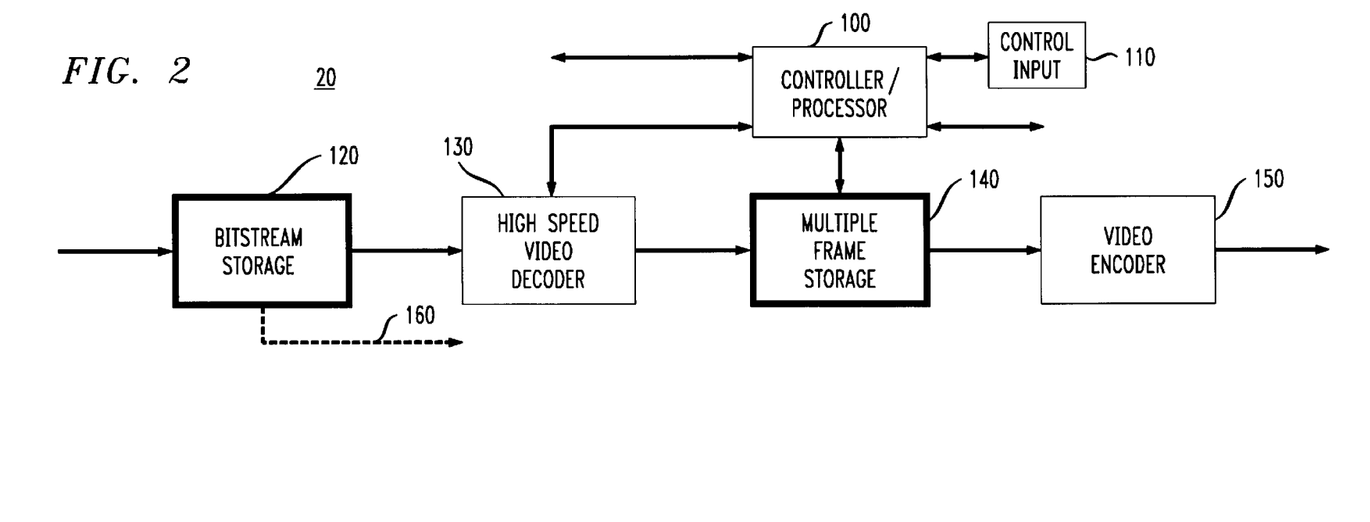
FIG. 2 provides a detailed block schematic diagram of one embodiment of a video telecommunication server according to the present invention.

As a solution to this problem and according to FIG. 2, a server 20 contains both a video decoder 130 and a video encoder 150. The server 20 decodes the entire received digital video telecommunication bitstream and may store all the decoded frames in frame store 140 or a representation of every nth frame of the decoded video signal. The server 20 actuates video encoder 150 to then re-encode all or a subset of these frames, for example, a representation of every nth frame of the decoded digital video signal, where n is greater than one, and represents the desired speed up rate, and retransmits this video telecommunication, as if it were the original telecommunication, toward the video decoder 30 (FIG. 1) where it is decoded and displayed in a conventional manner.

The relationship between high speed video decoder 130 and frame store 140 is now explored. Decoder 130 must decode the entire received telecommunication received in bitstream store 120. On the other hand, decoder 130 need only output every nth frame for storage in frame store 140. Frame store 140 only needs to store every nth frame for reencoding by video encoder 150.

Continuing the above example, for an eight times speed-up rate (n=8), consider a 129 frame sequence where frames 0–128 are decoded by the video server at video decoder 130. Only decoded frames 0, 8, 16, 24, 32 and so on are stored in multiple frame store 140. Video encoder 150 generates a fast forward (or fast reverse) bitstream using only the stored 0, 8, 16, 24 and so on frames. In other words, video encoder 150 generates frame 8 by predictively encoding frame 0, frame 16 is predicted from frame 8, frame 24 from frame 16 and so on. If a fast reverse bitstream is requested by the user via input 110, then frame 120 is predictively encoded from frame 128, frame 112 is predicted from frame 120, frame 104 is predicted from frame 112 and so on to form a fast reverse bitstream.

Other rates besides a speed-up rate of 8 are possible. Alternate speed-up rates may be selected via control input 110 by a user. Continuing with the discussion of FIG. 2, for example, multiple fast scan bitstreams may be encoded. For example, if both a speed up rate of n equals 4 and 8 are desired, a separate 4× and 8× fast scan bitstream can be generated from the same frame store contents 140. Video encoder 150 generates, for example, a fast forward 8× sequence comprising frames 0, 8, 16, 24 and so on and a 4× fast forward sequence comprising frames 0, 4, 8, 12, 16 and so on. Using speed-up factors n with even ratios such as 2, 4, 8, 16 and so on can allow for more efficient memory storage at multiple frame store 140, because, in this example, frame 16 is always used, frame 8 is used in three of the four generated fast scan frame sequence outputs and so on. To the contrary, if speed-up factors of 5 and 8 were selected, a 5× bitstream of 0, 5, 10, 15 would intersect only rarely (every 40th frame) with a 0, 8, 16, 24 generated bitstream.

Storage of a frame sequence at frame store 140 can be quite costly, although the costs of memory are decreasing significantly with time. In a video telecommunication server 20 for providing a video messaging service, this storage may only be required when the user is attempting to retrieve a message. In this case, when the subscriber to the service calls the server 20 to retrieve a message, the server 20 automatically decodes the message at video decoder 120 and stores the fast scan frames of interest (for reencoding at one or more speed-up rates). Then, when the subscriber sends a fast forward or fast reverse command for input at control input 110, the server encodes the fast forward (or reverse) bitstream at encoder 150 based on the stored frames. The fast scan bitstream is transmitted toward video decoder 30 (FIG. 1) which decodes the fast play bitstream and plays the speeded up video telecommunication on the user's conventional video decoder 30 as if it were the original video telecommunication.

Referring to FIG. 2, the video decoder 130 may have to operate at higher, real time speeds than a typical video telephone decoder 30 (FIG. 1) at a subscriber's premises. The server 20, for example, may have to permit the user to immediately fast forward through an entire video message as soon as message retrieval begins. For example, if an 8× speed-up is used, the video frames are needed 8 times faster than they would be if a standard speed video decoder were used. With existing processor speeds increasing every year as are memory capabilities, neither an eight times faster decoder processor 130 nor a large memory for frame storage 140 would seem to be out of the question. On the other hand, typical faster processors and more memory may result in greater cost of a video telecommunication server. This assumption leads to a principle that the video telecommunication server of the present invention is best provided as a shared resource, for example, as already suggested, as an adjunct to a local switching end office, at a toll office or at a private branch exchange. Furthermore, as a shared resource, the video telecommunication server 20 of the present invention may be shared by multiple users over time and its operation time multiplexed as necessary to provide blocks of service to many users simultaneously, for example, to include a small service delay.

Also, it should not be inferred from FIG. 2 or subsequent Figures as will be described herein that from the depicted arrangement of processing components 100, 130 and 150 that each is a separate hardware component as any of these may be integrated together, may be implemented in hardware, software or firmware and may be coupled with associated memory 120, 140 as if the memory were internal to a processor chip, connected by a high speed bus to one or more components or otherwise coupled and accessible in bit serial or parallel format.

For an example of a small service delay that a user may experience, a short delay can be required before a customer will receive their fast scan message to permit the decoder 130 to operate on the received video telecommunication bitstream stored in memory 120. In a shared resource environment, such a delay is expected. The reason for the delay is the capability to reduce the processing speed requirement and, hence, the cost of the high speed decoder 130.

Also, a more expensive video encoder 150 may be required in a server 20 of the embodiment of FIG. 2. When the server 20 encodes fast play frames at video encoder 150, predictions are formed over a larger time distance between frames than in the original bitstream. For example, it is easier to predict frame 1 from frame 0 than frame 8 from frame 0, and there may result an increased coding requirement. In particular, the motion estimation search range may have to be increased to achieve a better prediction and hence a resultant better video quality. On the other hand, in a typical video message, the scene is not going to change dramatically over time. a single person will typically generate only a changing facial expression with speech. However, the present invention contemplates, for example, the recording and play of a movie or guided tour when scenes will change and action within the scenes may be constantly varying. In such a scenario, a higher cost video encoder will be required.

Thus far, video frame encoding rates have been presumed to equal the video frame display rate, normally 30 frames per second. On the other hand, in H.263 encoding, it is common for the video to be encoded at a slower rate than the rate of display. Exploring this possibility, a caller may transmit a QCIF bitstream at 7.5 frames per second over POTS with a video bit rate of 24 kilobits per second. Video capture and display are still at the rate of 30 frames per second. Video capture frames are numbered 0, 1, 2, 3 and so on. The caller's encoded H.263 bitstream uses captured frames 0, 4, 8, 12 and so on and in a typical video telephone call, the receiver would decode frame 0, 4, 8, 12 and so on and display each of the frames four times to generate a 30 frame per second display rate, or in other words, frames 0, 0, 0, 0, 4, 4, 4, 4, 8, 8, 8, 8 and so on.

In this example, and in order to provide a fast scan, the server 20 stores the bitstream (for example, received from a POTS caller at just 28.8 kbits per second) and the called subscriber requests a fast forward, as before, for example, with a speed-up rate of 8×. If the connection between the server and the user has a high bit rate ( such as ISDN data rates or higher), the server 20 could encode a fast forward bitstream using frames 0, 8, 16, 32 and so on where each of these frames is displayed only once at the user's decoder 30.

When the bit rate between the server 20 and the decoder 30 may be limited to the same rate as the incoming call and video telecommunication to the server 20, for example, a POTS rate, the input frame rate should probably be matched (for example, to 7.5 frames per second) or even lowered at the output. Even if the motion estimation search range is increased when the predictive coding is performed over a larger frame distance (and especially if it is not), the quality of prediction may be reduced, and hence the coding efficiency reduced.

Continuing the above example, for an 8× speed-up rate and where the fast forward bitstream matches the frame rate of the incoming call, the fast forward bitstream encodes frames 0, 32, 64, 96, 128 and so on, each of which is displayed four times at the customer's decoder or in the sequence, 0, 0, 0, 0, 32, 32, 32, 32, 64, 64, 64, 64 and so on.

Video encoder 150 of server 20 can trade off frame rate and video quality of each picture. For example, another possible solution at video encoder 150 would halve the bit rate allocated to each frame and double the frame rate. Thus, the encoder 150 would use frames 0, 16, 32, 48 and so on, each frame of which is displayed twice at the customer's decoder resulting in a fast scan bitstream to be displayed of 0, 0, 16, 16, 32, 32 and so on. Halving the bit rate per frame, however may result in a significant reduction in the displayed resolution and quality of each displayed frame.

To illustrate the storage costs at a video telecommunication server 20, consider a typical example of a 28.8 (POTS) kbps connection for an H.324 call including video, audio and control. Video requires the largest portion of the available bit rate. Storing a 2 minute segment of a message would require storage space of 120 seconds ×28.8 kilobits per second or approximately 3.6 megabits or 432 kilobytes of digital video bitstream storage 120. If the frame rate is 7.5 frames per second and the speed-up rate is 8×, then the fast play frames would require 2×60×7.5/8 or 112.5 frames. Each QCIF frame is 4:2:0 176×144 pixels or 38 kilobytes. So storage of a two minute message requires 38 kilobytes ×112.5 frames or 4.8 megabytes of memory, which is required only when the customer is currently retrieving this message.

Figure 3:
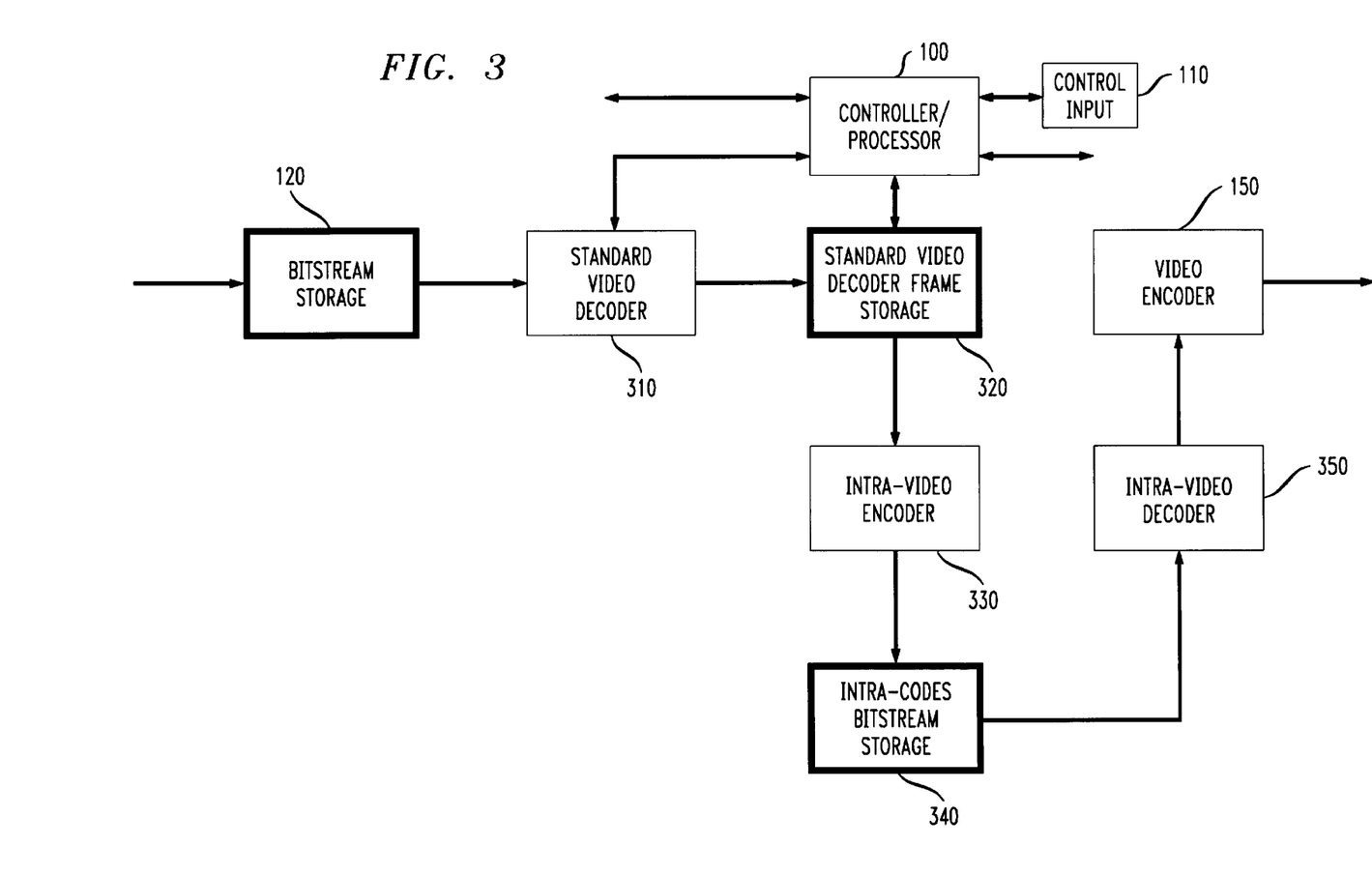
FIG. 3 provides a detailed block schematic diagram of a second embodiment of a video telecommunication server according to the present invention which conserves memory requirements.

Now referring to FIG. 3, an embodiment will be considered and described in which memory conservation is considered. Newly introduced components in FIGS. 3 and 4 receive reference numerals beginning with the figure number in which they first appear. For example, standard video encoder 310 first appears in FIG. 3 and appears again in FIG. 4 while a video encoder with an extra intra frame 410 first appears in FIG. 4.

A standard video decoder 310 (replacing high speed video decoder 130) decodes the incoming bitstream and stores the decoded incoming video telecommunication in multiple frame store 320. Multiple frame store 320 in one embodiment stores decoded frames just long enough for the decoded frames to be intracoded at intra video encoder 330. Consequently, frame store 320 may be a temporary storage area for decoded frames to be intra-coded and then stored as intra-coded frames. Frame store 320 is referred to in the drawing as a standard video decoder frame storage 320. Intra video encoder 330 encodes the received decoded digital video telecommunication as an intracoded bitstream for storage in intracoded bitstream store 340. In this second embodiment of the invention of FIG. 3, the fast play frames are stored compressed in intra format via intra video encoder 330. Consequently, an intra video decoder 350 can easily provide video frames at any desired speed-up rate directly to a fast scan video encoder 150 for output on demand. The storage requirements can be reduced by a factor of approximately 3 to 10 in this embodiment, depending on the intracoding compression ratio, which depends on scene content and image quality constraints.

Figure 4:
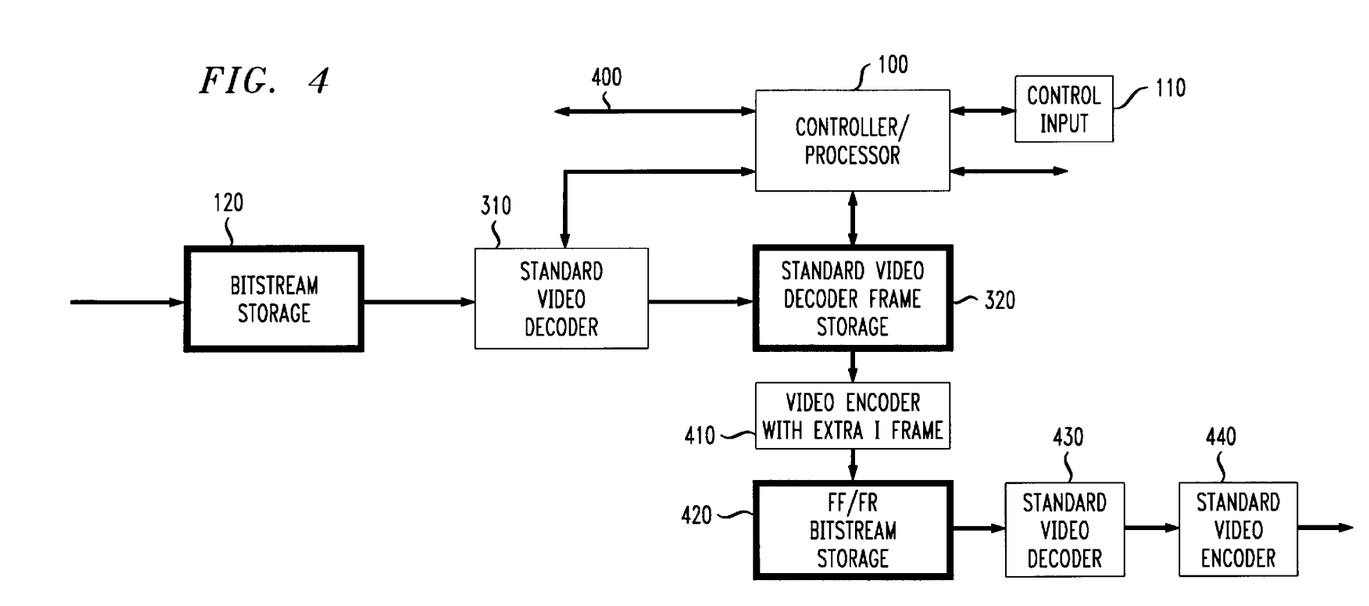
FIG. 4 provides a detailed block schematic diagram of a third embodiment of a video telecommunication server according to the present invention which further conserves memory in comparison with the embodiment of FIG. 3.

Referring to FIG. 4, the controller/processor 100 operates to have the server 20 receive the message and store the message at store 320 as an intracoded video bitstream. Intra video encoder 340 places intracoded frames in the bitstream at regular points, for example, once every 2 seconds of received video telecommunication. The frame rate or quality of the image is reduced to make up for the intra-overhead but the resulting bitstream may suffer in perceived quality when played.

Also, according to the ITU standards, the server 20 may periodically request a caller's encoder 10 to transmit an intracoded frame. This embodiment is considered also as a variation of the embodiment of FIG. 4. Controller/processor 100 can periodically request the calling encoder 10 (FIG. 1) to transmit an intracoded frame as suggested by request line 400. While operating in a fast scan mode, the server 20 of FIG. 4 decodes quickly and re-encodes. FIG. 4 shows the same or similar standard video decoder 310 and frame store 320 for receiving and storing a decoded, uncompressed video telecommunication as are shown and described with reference to FIG. 3. However, the server 20 of FIG. 4 differs from FIG. 3 in the video encoder 410 and storage at store 420 of a fast scan (fast forward/fast reverse) bitstream for standard decoding at decoder 430 and reencoding at encoder 440. Video encoder 410 comprises a video encoder having a capability for encoding an extra intra (I) frame of the stored frame sequence of store 320. For example, define a set of frames between intra frames as a GOP (group of pictures). During fast reverse, the standard video decoder 430 must receive an entire GOP before it can start decoding. Server 20 keeps ahead of the subscriber's fast scan request by maintaining a buffer of already decoded frames of a GOP on each side in time of the GOP of the current play position in fast scan (FF/FR) bitstream memory 420. In particular, and by way of example, if each 60th frame is coded intra, with a 7.5 frame per second frame rate where each 4th frame was actually encoded in the original bitstream, then frames 0, 4, 8, 12, 16 . . . 56 make up the first GOP and frames 60, 64, 68, 72 . . . 116 make up the second GOP and so on. As the subscriber is playing frames in the second GOP, the standard video decoder 430 of the server 20 of FIG. 4 should decode the first GOP and the GOP immediately following the second GOP or the third GOP comprising frames 120 to 176. Then the video decoder 430 will be ready if the subscriber wants to fast forward or fast reverse from the GOP being displayed and standard video encoder 440 will only have to encode those frames requested, and not have to decode them, because the work is already done.

This is especially important for fast reverse because the GOP's are coded in forward order and so to encode a fast reverse bitstream from the first GOP, the server 20 would encode frames in the order 56, 48, 40, 32, 16, 8, 0. Frame 56 is needed first for re-encoding by the server 20 but is not made available to the server 20 until frames 0–52 have already been decoded.

Multiple speed-up rates were already discussed in connection with the embodiment of FIG. 2 of server 20. Multiple speed-up rates may also be supported in the embodiments of FIGS. 3 and 4. For example, for the embodiment of FIG. 3, the intravideo encoder 330 encodes frames 2, 4, 6, 8 and so on to support rates of 2×, 4×, 6×, 8× and so on. Generally then, every nth frame is intracoded at intravideo encoder 330 for any selected value of "n" and, thus, this embodiment supports any speed up rate "n". The lower the speed-up rate, the more complicated becomes the intracoding at encoder 330 and the requirements on the output component requirements, for example, because the predictive coding becomes more complicated.

In these embodiments of FIGS. 3 and 4, the fast scan frames may be stored via inter compression using a power series expansion as described below. Consider an example with a 30 frame per second video where frames 0, 1, 2, 3, 4 and so on are encoded and speed-up rates of 2, 4 and 8 are supported. For the 8× speed up rate, frame 8 is stored inter compressed and predicted from frame 0, frame 16 is predicted from frame 8 and so on so that the frames stored comprise frames 0, 8, 16, 24 and so on.

To additionally support a 4× speed up rate, frame 4 is stored inter compressed and predicted from frame 0. Frame 8 is already available from the 8× speed-up rate decoding/encoding process. Frame 12 is stored predicted from frame 8 and so on.

Figure 5:
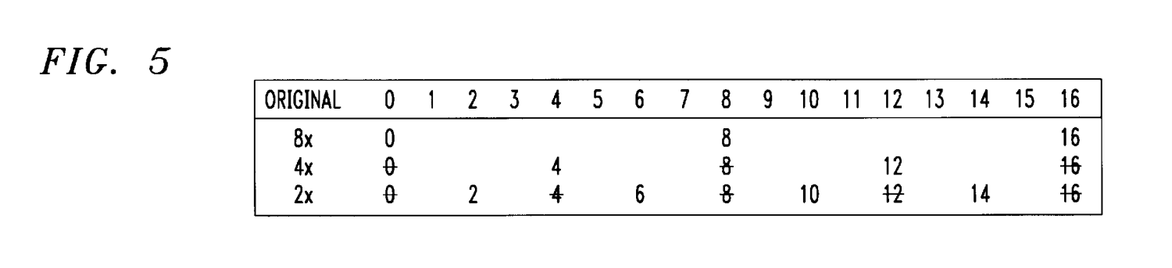
FIG. 5 is a table of frame storage reqirements.

To additionally support a 2× speedup rate, frame 2 is stored inter predicted from frame 0. Frame 4 is already available from the 4× case. Frame 6 is stored predicted from frame 4, and so on. The frame storages required are indicated in the table of FIG. 5. "Original" and the following numbers represent the frame sequence 0–16 of an original video telecommunication. In the table of FIG. 5, the stricken-through frame numbers for successively slower speed-up rates of 8×, 4×and 2× do not require additional storage because they are already available if the higher speed above is supported. In this power series, multiple speed-up rate approach, to support a fast reverse mode, intracoded entry frames need to be occasionally inserted into the bitstream. Alternatively, two sets of compressed frames, inter predicted forwards and backwards sets of frames can be stored. Yet another alternative is to encode a fast forward bitstream by decoding the entire bitstream and encoding it at the speed-up rate and then storing that result as well.

In operation, a subscriber to a service according to the present invention may find it useful to transition from a fast scan to a normal play mode and the reverse. For example, a subscriber is watching a video telecommunication at normal speed, misses something, fast reverses and then resumes normal play in order to see or hear a segment again.

First consider the transition from fast play to normal play. For example, frames 0, 8, 16, 24 and so on are played and then the subscriber wants to see frames 25, 26, 27, 28 and so on. For any of the above-described embodiments of FIGS. 2–4, a simple way to transition is to start sending the bitstream directly from the bitstream store 120 bypassing the frame store 140 and the decoder/encoder beginning at the requested frame, frame 25 in this example. This is shown, by way of example, as the dashed line bypass route 160 in FIG. 2. Frame 25 will be decoded off of the fast play frame 24 rather than the original coded frame 24 (which would be more accurate). This means that the video quality at first will be poor and may continue for several frames until enough intra updates have taken place because the prediction will not be as accurate as with the correct frame. Quality will depend on how closely the fast play frame 24 represents the real frame 24.

In an alternative method, one would reencode the data for frame 25. In regard to the embodiment of the invention shown in FIG. 2, frame 24 is stored although frame 25 is not. Frame 25 can be decoded at decoder 130 by pulling the frame's bits out of the bitstream, referenced to the normal play frame 24 that is stored. Then frame 25 can be encoded at encoder 150 referring to the fast play frame 24. One version could send the bitstream's frame 26, without reencoding, even though the encoded frame 25 will not be the same as in the original bitstream. It may be appropriate to allocate extra bits to frame 25, slowing the transition slightly, in order to have frame 25 as accurate as possible. To summarize, then, the first frame into normal play after the transition can be reencoded, possibly using extra bits, and then the second and subsequent frames are just used from the bitstream (as stored in bitstream store 120).

Alternatively, decoding and reencoding of subsequent frames can continue for some number of frames or even for the entire video telecommunication sequence. A video encoder 150 and decoder 130 are already required to be available in a video telecommunication server 20 of the present invention. This encoder and decoder do not have to be fast speed operators (as shown in FIG. 2) but can be a standard video encoder and decoder operating at normal speed.

Applying these same transition discussions to the embodiment of FIG. 3 is similar to those for the first embodiment of FIG. 2. The key difference is that the intra frame 24 must be intra decoded before frame 25 that references it can be decoded. There will be some additional errors in the normal play encoding, because the intra encoded frame 24 is not identical to the originally coded frame 24. However, if the intra storage 340 has high quality, the perceived effect to a user should be minimal.

Referring briefly to FIG. 3, more intra decoding at decoder 350 may be required in order to re-create the normal play frames from intracoded bitstream storage 340.

Thus there has been shown and described a number of embodiments of a video telecommunication server providing fast scan capabilities, either in a forward or reverse play direction. Other variations may come to mind from studying the above description. Any United States patent applications or patents referenced herein should be deemed to be incorporated by reference as to their entire contents for explaining any of the principles of the present invention. The invention should only be deemed to be limited by the scope of the claims which follow.

What I claim is:

1. A video telecommunication server for use in providing a fast scan of a coded video telecommunication comprising
   a digital video bitstream store for receiving and storing a coded digital video bitstream of a video telecommunication,
   a video decoder for decoding said coded digital video bitstream and outputing a decoded digital video signal,
   a video signal store for storing a representation of every nth frame of said decoded digital video signal, where n is greater than one, depending on a speed-up rate, and
   a video encoder for encoding said decoded digital video signal for output as a fast scan video telecommunication bitstream.

2. A video telecommunication server as in claim 1 wherein said video encoder encodes a predictive coding of a sequence formed of every nth frame stored in said video signal store.

3. A video telecommunication server as in claim 1 wherein said video encoder outputs an intracoding of every nth frame.

4. A video telecommunication server as in claim 1, said server periodically requesting an intracoded frame from a video encoder transmitting said video telecommunication.

5. A video telecommunication server as in claim 1, said server further comprising an input for receiving a signal indicating a speed-up rate n.

6. A video telecommunication server as in claim 1, said video encoder for encoding said decoded digital video signal for output at plural speed-up rates n.

7. A video telecommunication server as in claim 1 wherein said coded video telecommunication is compressed, said video decoder for decoding and decompressing all of said stored digital video bitstream.

8. A video telecommunication server as in claim 1 wherein said coded video telecommunication is compressed according to ITU standards.

9. A video telecommunication server as in claim 1 wherein said coded video telecommunication is also compressed and said video decoder operates at sufficiently high speeds to decode and decompress said received telecommunication as soon as said telecommunication is retrieved at said speed-up rate.

10. A video telecommunication server as in claim 2 wherein said video encoder has a sufficiently increased motion estimation range to achieve prediction in a sequence of frames comprising action and changes in scenes in real time at reasonable perceived quality.

11. A video telecommunication server as in claim 1, wherein said video encoder encodes frames at a rate that is not equal to a frame rate of said received video telecommunication.

12. A video telecommunication server as in claim 1, wherein said video encoder encodes frames at a different bit rate than a bit rate of a received video telecommunication.

13. A video telecommunication server as in claim 1, wherein said server further comprises an input for receiving fast scan direction data, said fast scan being in a selected fast forward or fast reverse direction.

14. A video telecommunication server for use in providing a fast scan of a coded video telecommunication comprising
a digital video bitstream store for receiving and storing a coded digital video bitstream of a video telecommunication,
a video decoder for decoding said coded digital video bitstream and outputting a decoded digital video signal,
a video signal store for storing a representation of every nth frame of said decoded digital video signal, where n is greater than one, depending on a speed-up rate,
a video encoder for encoding said decoded digital video signal for output as a fast scan video telecommunication bitstream, and
an intra video encoder, an intra-coded bitstream storage and an intra video decoder for outputting an intra-decoded sequence of frames for encoding by said video encoder.

15. A video telecommunication server for use in providing a fast scan of a coded video telecommunication comprising
a digital video bitstream store for receiving and storing a coded digital video bitstream of a video telecommunication,
a video decoder for decoding said coded digital video bitstream and outputting a decoded digital video signal,
a video signal store for storing a representation of every nth frame of said decoded digital video signal, where n is greater than one, depending on a speed-up rate,
a video encoder for encoding said decoded digital video signal for output as a fast scan video telecommunication bitstream, and
a video encoder having an extra I frame, a fast scan bitstream store, and a video decoder for outputting a sequence of frames for encoding by said video encoder.

16. A method of providing a fast scan of a coded video telecommunication comprising the steps of
storing an input digital video bitstream representing said coded video telecommunication,
decoding said stored digital video bitstream,
storing a representation of every nth frame of said decoded digital video signal, where n is greater than one, depending on a speed-up rate, and
reencoding said digital video signal for output as a fast scan video telecommunication bitstream.

17. A method of providing a fast scan as in claim 16 wherein said reencoding step comprises encoding a predictive coding of a sequence formed of every stored nth frame.

18. A method of providing a fast scan as in claim 16 wherein said encoding step comprises intracoding every nth frame.

19. A method of providing a fast scan as in claim 16 further comprising the step of periodically requesting an intracoded frame from a video encoder transmitting said video telecommunication.

20. A method of providing a fast scan as in claim 16, further comprising the step of receiving an input indicating a speed-up rate n.

21. A method of providing a fast scan as in claim 16, wherein said encoding and decoding of said digital video signal is performed at plural speed-up rates n.

22. A method of providing a fast scan as in claim 16 wherein said coded video telecommunication is compressed, and said decoding step comprises decoding and decompressing all of said stored digital video bitstream.

23. A method of providing a fast scan as in claim 16 wherein said coded video telecommunication is compressed according to ITU standards.

24. A method of providing a fast scan as in claim 16 wherein said coded video telecommunication is also compressed and said decoding step is performed at sufficiently high speeds to decode and decompress said received telecommunication as soon as said telecommunication is retrieved at said speed-up rate.

25. A method of providing a fast scan as in claim 17, said video encoding step having a sufficiently increased motion estimation range to achieve prediction in a sequence of frames comprising action and changes in scenes in real time at reasonable perceived quality.

26. A method of providing a fast scan as in claim 16, said video encoding step operating to encode frames at a rate that is not equal to a frame rate of said received video telecommunication.

27. A method of providing a fast scan as in claim 16, said video encoding step encoding frames at a different bit rate than a bit rate of a received video telecommunication.

28. A method of providing a fast scan as in claim 16 further comprising the step of receiving an input signal representing a choice of fast scan direction, said fast scan being in a selected fast forward or fast reverse direction.

29. A method of providing a fast scan as in claim 16 further comprising the steps of receiving a signal indicative of a change of speed to normal and outputting said stored digital video bitstream and bypassing said decoding, representation storing and reencoding steps.

30. A method of providing a fast scan comprising steps of:
storing an input digital video bitstream representing said coded video telecommunication;

decoding said stored digital video bitstream;

storing a representation of every nth frame of said decoded digital video signal, where n is greater than one, depending on a speed-up rate;

intracoding said stored frame sequence;

storing an intracoded bitstream;

intra video decoding said intracoded bitstream for outputting an intra-decoded sequence of frames for reencoding; and reencoding said digital video signal for output as a fast scan video telecommunication bitstream.

31. A method of providing a fast scan comprising steps of:

storing an input digital video bitstream representing said coded video telecommunication, decoding said stored digital video bitstream, storing a representation of every nth frame of said decoded digital video signal, where n is greater than one, depending on a speed-up rate;

intracoding an extra I frame;

storing a fast scan bitstream;

decoding said fast scan bitstream to output a sequence of frames for encoding by a video encoder; and reencoding said digital video signal for output as a fast scan video telecommunication bitstream.

* * * * *